United States Patent Office 3,121,128
Patented Feb. 11, 1964

3,121,128
PROCESS OF MAKING SHAPED FUEL FOR
NUCLEAR REACTORS
William Joseph O'Leary, Claymont, Del., and Eugene A. Fisher, Fostoria, Ohio, assignors to the United States of America as represented by the United States Atomic Energy Commission
No Drawing. Filed Feb. 7, 1962, Ser. No. 171,777
10 Claims. (Cl. 264—21)

This invention deals with a process of making shaped ceramic-type uranium dioxide fuel for nuclear reactors and with the fuel obtained by the process.

One of the most important requirements of "nuclear fuel" is a good thermal conductivity. In order to obtain a fuel of this desired characteristic, a well-conducting additive has been incorporated heretofore in the uranium dioxide prior to shaping it. However, these additives have to be limited to small quantities, usually to from 0.1 to 1% by weight, in order not to increase the neutron-capture cross section of the fuel to a degree that makes a continuous operation of the reactor difficult or impossible. A homogeneous uniform mixture of such minute amounts of heat-conducting material with the uranium dioxide could not be prepared heretofore.

It is an object of this invention to provide a process of making a fuel composed of a homogeneous uniform mixture of uranium dioxide and a small amount of an additive of good heat conductivity.

It is another object of this invention to provide a process of making fuel based on uranium dioxide that is characterized by good thermal conductivity.

It is also an object of this invention to provide a process of making fuel based on uranium dioxide that has great strength.

It is finally also an object of this invention to provide a process of making fuel based on uranium dioxide that has a high density.

The objects specified above, according to this invention, are accomplished by mixing uranium dioxide powder with an oxidic additive which can be easily converted to a heat-conducting refractory compound; compacting the powder mixture into the shape desired of the fuel; and sintering the shaped material in an atmosphere reactive with the additive so as to reduce it and convert the reduced substance to a refractory.

Various types of uranium dioxide are suitable for the process of this invention, such as standard ceramic-grade oxide or uranium dioxide prepared from an aqueous uranium-containing solution; for instance, uranium dioxide obtained by the precipitation of ammonium diuranate and calcination of the precipitate at between 760 and 870° C. was found satisfactory for the process of this invention. Th invention is also applicable to thorium oxide containing a smaller or greater amount of uranium dioxide as it is often used for blankets of breeder reactors. Furthermore, uranium dioxide can be used that has accumulated as scrap, for instance during the machining of fuel elements. For satisfactory operation it is important that the uranium oxide material have a small and uniform particle size; partciles of between 0.5 and 2 microns, but preferably of less than 1 micron, were desirable.

The oxidic additive or densifier should be reducible under the conditions of this process; preferably it should form a mixture with the uranium dioxide of a lower melting point than the dioxide itself, and the reduced product should react with the atmosphere used in the process to form a refractory compound. Molybdenum oxide, titanium dioxide and niobium pentoxide, for instance, answer these requirements. The quantity preferred of the densifier is within the range of 0.1 to 1% by weight, the optimum being an amount of above 0.2%. Titanium dioxide is the most effective additive.

In order to facilitate the compacting step and to prepare bodies of improved strength, one or several plasticizers or binders are advantageously added. The plasticizer can be an inorganic compound, such as bentonite, or it can be an organic compound that is removed by the sintering step, e.g. methylcellulose, ammonium alginate, propylene glycol alginate or any mixture of these binders. While the total amount of these plasticizers can vary widely, it preferably is between 0.1 and 5% by weight; the addition of 0.05 to 3% but preferably 0.5% of bentonite and from 0.05 to 2% of methylcellulose, propylene glycol alginate and/or ammonium alginate has resulted in the best mixture. (Because the organic plasticizers are decomposed and volatilized during sintering, their weight is expressed throughout this application as the percentage in regard to the sintered product; the inorganic binder bentonite and other additives are given in percent of the mixture prior to sintering.)

The plasticizers are preferably added in the form of a solution or suspension in a liquid medium. Water is a satisfactory liquid, but methyl alcohol, ethyl alcohol, methylethyl alcohol mixtures and polyvinyl alcohol were found to yield a softer and finer cake than does water. The mixing step can be carried out by any means known to those skilled in the art. A ball mill using alumina pebbles was preferred as the grinding device. A milling time of between 4 and 8 hours was found sufficient, the time greatly depending on the particle size of the urania; the coarser the urania is, the longer a mixing procedure within the specified range is required.

The mixture is then compacted into the form desired, such as pellets, rods and tubes. Conventional means, for instance, vibratory molding, cold or hot pressing, injection molding and compression molding, can be used for this purpose. However, the best results were obtained with extrusion; it yielded elements of the greatest density, greatest fission-product-gas retention, highest shock resistance at elevated temperature, and a minimum of surface cracks. The rods or cylinders made by extrusion usually were very straight, so that they could be inserted into and removed from metal jackets of very little clearance without becoming jammed. If desired, the extruded cylinders or rods can be cut into small pellet-like pieces.

The shaped bodies are dried first at room temperature for approximately 24 hours and, for instance, in the case of ethyl alcohol, at about 55° C. for another 24 hours.

Finally, the elements are fired or sintered. This is done while they are in contact with a gas that reduces the oxide and reacts with the compound formed to convert it to a refractory. Carbon monoxide or dioxide with or without hydrogen, cracked ammonia or a hydrogen-nitrogen mixture of other sources are suitable gases; the hydrogen reduces, for instance, the titanium dioxide to titanium monoxide which then reacts with the nitrogen of the gas mixture and forms titanium nitride. Hydrocarbons were also found satisfactory; in this case carbides are the refractory compounds formed.

The sintering temperature for optimal density is within the range of 1500 to 1600° C. At temperatures above 1600° C. the density does not increase further, and at temperatures above 1650° C. it even decreases. Sintering for about 90 minutes was found satisfactory.

The densifiers, such as molybdenum oxide, titanium dioxide and niobium oxide, are very voluminous compounds, so that it is no problem to prepare a homogeneous mixture of small weights of these oxidic additives with the uranium dioxide material. By then producing the considerably less voluminous carbides or nitrides in situ, a homogeneous mixture of the uranium material with the refractory carbide or nitride is accomplished.

In the following, a few examples are given to illustrate the process of this invention.

EXAMPLE I

The procedure used in the experiments of this example comprised mixing of uranium dioxide with a plasticizer with or without a densifier and ethyl alcohol in a ball mill containing alumina pebbles, extrusion of the material using a tungsten carbide die, volatilization of the alcohol by maintaining the bodies formed first at room temperature for 24 hours and then by heating at 55° C. for another 24 hours. The extrusions were then cut into 1-inch long samples and the ends were machined square with a tungsten carbide facing tool. Finally, the samples were sintered in cracked ammonia at different temperatures. The other conditions and the densities of the fuel elements prepared are summarized in Table I.

effect in the process of this invention. For this purpose 0.2 and 0.5%, respectively, of the material to be tested was added to urania obtained by the calcination, at 870° C., of precipitated ammonium diuranate. The urania had an average particle size of 0.5 micron. The urania-densifier mixture in each case was pressed in the form of a cylindrical disk at 2500 p.s.i., and the disks were sintered at between 1550 and 1600° C. for 90 minutes. One control test was carried out with urania containing none of the materials to be tested, and the densities of the additive-containing disks were compared with it.

Of the materials examined, the following were found suitable densifiers; they are listed in the order of decreasing effectiveness: chromium oxide, zinc oxide, ferric oxide, zirconium oxide, aluminum oxide and tin oxide. Dolomite, talc, zircon, silicon carbide, barium carbonate, calcium fluoride, magnesium fluoride, cerium oxide and molybdenum had either no or an unfavorable effect on the density.

Table I

| Composition | | | Green density, g./cm.³ | Densities after sintering— | | | |
|---|---|---|---|---|---|---|---|
| $UO_2$ Material | Plasticizer | Densifier | | at ~1540° C. for 45 min. | at 1607° C. for 45 min. | at 1607° C. for 90 min. | at 1710° C. for 45 min. |
| Ceramic-type urania | 0.63 w/o methylcellulose<br>0.63 w/o $NH_4$ alginate | -------- | 4.80 | 9.45 | 9.56 | 9.67 | 9.75 |
| | 0.5 w/o methylcellulose<br>0.5 w/o bentonite | 0.20% $TiO_2$ | 5.30 | 10.63 | 10.71 | 10.69 | 10.72 |
| Obtained by precn. of ammonium diuranate from aq. soln. and calcination at 815° C. | 0.63 w/o methylcellulose<br>0.63 w/o $NH_4$ alginate | -------- | 3.93 | 8.39 | 9.47 | 9.99 | 9.85 |
| | 0.5 w/o methylcellulose<br>0.5 w/o bentonite | 0.20% $TiO_2$ | 4.02 | 9.46 | 10.32 | 10.42 | 10.06 |

The results of these runs show that the incorporation of titanium dioxide yields a higher-density product than do the examples with plasticizers only. The experiments also indicate that heating for 90 minutes is optimal and that temperatures above about 1600° C. do not lead to a further improvement of the density.

EXAMPLE II

In another series of runs the same procedure as that of Example I and samples of the same two compositions which contained titanium dioxide were used. The sintering times were varied from 45 to 135 minutes, while the sintering temperature was 1710° C. in all instances. For both fuel compositions curves were plotted to illustrate the relationship between sintering times and densities. The curves obtained were parabolas whose apexes were located approximately at a sintering time of 90 minutes. Sintering for longer than 90 minutes brought about a considerable reduction of the densities as did sintering for less than 90 minutes.

EXAMPLE III

Sixteen materials were examined as to their densifying

The next example shows the effect of various plasticizers.

EXAMPLE IV

A number of extruded specimens were prepared from a mixture of uranium dioxide, 0.2% titanium dioxide and various quantities of methylcellulose together with additional organic plasticizers with and without bentonite. Two parallel tests were carried out in each instance, one using a sintering temperature of 1593° C. and the other one that of 1724° C. The compositions of the extruded sintered samples and the results are shown in Table II.

Table II

| Run No. | Composition, percent by weight | | | | | Green density, g./cc. | Density, g./cc., when sintered at— | |
|---|---|---|---|---|---|---|---|---|
| | $UO_2$ | $TiO_2$ | Bentonite | Methylcellulose | Other organic plasticizer | | 1593° C. | 1724° C. |
| 1 | 99.8 | 0.2 | -------- | 0.75 | 0.75 low-viscosity ammonium alginate | 4.42 | 9.43 | 9.51 |
| 2 | 99.8 | 0.2 | -------- | 0.75 | 0.75 propylene glycol alginate | 4.67 | 9.55 | 9.87 |
| 3 | 99.8 | 0.2 | -------- | 0.75 | 0.75 amioca starch | 4.56 | 9.21 | 9.62 |
| 4 | 99.8 | 0.2 | -------- | 0.75 | 0.75 polyacrylimide | 4.73 | 9.46 | 9.71 |
| 5 | 99.8 | 0.2 | -------- | 0.75 | 0.75 hydroxyethylcellulose | 4.47 | -------- | 9.98 |
| 6 | 99.3 | 0.2 | 0.5 | 0.25 | 0.25 polyacrylimide | 4.69 | 10.15 | 10.18 |
| 7 | 99.3 | 0.2 | 0.5 | 0.25 | 0.25 propylene glycol alginate | 4.70 | 10.40 | 10.30 |
| 8 | 99.3 | 0.2 | 0.5 | 0.25 | 0.25 ammonium alginate | 4.63 | 10.37 | 10.38 |

Table II illustrates that a mixture of bentonite and organic plasticizer yields radically denser products than do the mixture not containing bentonite. Of the organic plasticizers used in addition to methylcellulose, propylene glycol alginate and ammonium alginate yielded the most favorable results. The experiments of Table II also show again that a sintering temperature of about 1600° C. is at least as good as the temperature of 1724° C.

In most of the examples described above, the thermal conductivity was determined by measuring the temperature at the two ends of the specimen. Under the assumption that most of the heat flows in the direction of the main longitudinal axis of a cylindrical sample, it was deduced that the greater the temperature difference was, the poorer was the heat conductivity. It was always true, as was to be expected, that the specimens of greater density had the better heat conductivity.

It will be understood that the invention is not to be limited to the details given herein but that it may be modified within the scope of the appended claims.

What is claimed is:

1. A process of making uranium-dioxide-base fuel bodies for nuclear reactors, comprising adding to uranium dioxide from 0.1 to 1% by weight of an oxidic densifier that can be readily converted to a heat-conducting refractory compound, said densifier being selected from the group consisting of tin oxide, aluminum oxide, zirconium oxide, ferric oxide, zinc oxide, chromium oxide, molybdenum oxide, titanium oxide and niobium oxide; adding a plasticizer consisting of from 0.05 to 3% by weight of bentonite as to the mixture obtained and from 0.05 to 2% by weight, as to the sintered product, of a substance selected from the group consisting of methylcellulose, propylene glycol alginate and ammonium alginate; compacting the mixture obtained into the shape desired; and sintering the shapes formed in an atmosphere reactive with the densifier so as to reduce the densifier and convert it to a refractory compound.

2. The process of claim 1 wherein the uranium dioxide has a particle size of between 0.5 and 2 microns.

3. The process of claim 1 wherein at least 0.2% by weight of the densifier is added.

4. The process of claim 1 wherein the plasticizer is added in a liquid medium selected from the group consisting of water, methyl alcohol, ethyl alcohol, polyvinyl alcohol and mixtures thereof.

5. The process of claim 1 wherein the compacted mixture prior to sintering is dried first at room temperature, then at a temperature of about 55° C. and the dried mixture is sintered at between 1500 and 1600° C. for approximately 90 minutes in an atmosphere selected from the group consisting of carbon monoxide, carbon dioxide, carbon monoxide-hydrogen, carbon dioxide-hydrogen, nitrogen-hydrogen, and mixtures thereof.

6. The process of claim 5 wherein the atmosphere is cracked ammonia.

7. The process of claim 1 wherein 0.2% by weight of titanium dioxide, 0.5% by weight of bentonite, 0.25% by weight of methylcellulose and 0.25% by weight of an organic plasticizer are added to the uranium dioxide, the percentages of methylcellulose and organic plasticizer referring to the product after sintering.

8. The process of claim 7 wherein the organic plasticizer is ammonium alginate.

9. The process of claim 7 wherein the organic plasticizer is propylene glycol alginate.

10. The process of claim 7 wherein the organic plasticizer is polyacrylimide.

References Cited in the file of this patent

UNITED STATES PATENTS

| | | |
|---|---|---|
| 2,719,786 | Fredenburgh | Oct. 4, 1955 |
| 2,799,912 | Greger | July 23, 1957 |
| 2,897,572 | Hansen | Aug. 4, 1959 |
| 3,001,871 | Thien Chi et al. | Sept. 26, 1961 |

FOREIGN PATENTS

| | | |
|---|---|---|
| 831,679 | Great Britain | Mar. 30, 1960 |

OTHER REFERENCES

AEC Document WAPD–PWR–PMM–466 (Del.), June 1956, pp. 70, 71.

AEC Document TID 7546, Book #2, pp. 378, 435, 533, November 1957.

2nd Geneva Conference on Atomic Energy, vol. 6, pp. 590–603, September 1958.

Nuclear Fuel Elements, Hausner et al., pp. 200–202 and 208, Reinhold Publishing Corp., New York, November 1959.